(12) United States Patent
Fujisawa et al.

(10) Patent No.: US 9,229,665 B2
(45) Date of Patent: Jan. 5, 2016

(54) PRINTING CONTROL SERVER, PRINTING CONTROL METHOD, AND PRINTING SYSTEM FOR CONTROLLING PRINTING USING EMAIL ADDRESS

(71) Applicant: SEIKO EPSON CORPORATION, Tokyo (JP)

(72) Inventors: Takatoshi Fujisawa, Nagano (JP); Norihiko Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/495,257

(22) Filed: Sep. 24, 2014

(65) Prior Publication Data

US 2015/0169256 A1    Jun. 18, 2015

(30) Foreign Application Priority Data

Dec. 18, 2013    (JP) .................................. 2013-260967

(51) Int. Cl.
*G06F 3/12* (2006.01)
*H04N 1/00* (2006.01)
*G06K 15/02* (2006.01)

(52) U.S. Cl.
CPC ................ *G06F 3/122* (2013.01); *G06F 3/126* (2013.01); *G06F 3/1224* (2013.01); *G06F 3/1236* (2013.01); *G06F 3/1289* (2013.01); *G06K 15/1822* (2013.01); *H04N 1/00233* (2013.01); *H04N 1/00244* (2013.01)

(58) Field of Classification Search
None
See application file for complete search history.

(56) References Cited

U.S. PATENT DOCUMENTS

2005/0257126 A1* 11/2005 Hagiuda et al. ............... 715/500
2008/0307059 A1* 12/2008 Ono ................................ 709/206

FOREIGN PATENT DOCUMENTS

| JP | 2005-115559 A | | 4/2005 |
|---|---|---|---|
| JP | 2006171866 A | * | 6/2006 |

* cited by examiner

*Primary Examiner* — Thomas D Lee
(74) *Attorney, Agent, or Firm* — Global IP Counselors, LLP (57) ABSTRACT

A printing control server includes a device management section which manages a printer device and a device designating character string unique to the printer so as to be associated, a settings management section which manages a printing condition and a printing conditions designating character string set for each printing condition so as to be associated, a receiving section which receives an email including a domain in a destination address, a settings section which, when a first address where a local section includes the device designating character string and a second address where a local section includes the printing conditions designating character string are included as the destination of the email, sets the printing condition corresponding to the second address with the printer device corresponding to the first address as a printing destination, and a printer communication section which executes printing based on the email using the printing condition.

8 Claims, 6 Drawing Sheets

| Device Designating Character String | Device ID |
|---|---|
| abxpet9rw7 | abxpet9rw7 |
| hptegt7vv2 | hptegt7vv2 |

Fig. 2B

| Printing Conditions Designating Character String | Printing Condition |
|---|---|
| mono | Monochrome |
| draft | Draft |
| double | Double-sided |

Fig. 7

PRINTING CONTROL SERVER, PRINTING CONTROL METHOD, AND PRINTING SYSTEM FOR CONTROLLING PRINTING USING EMAIL ADDRESS

CROSS-REFERENCE TO RELATED APPLICATIONS

This application claims priority to Japanese Patent Application No. 2013-260967 filed on Dec. 18, 2013. The entire disclosure of Japanese Patent Application No. 2013-260967 is hereby incorporated herein by reference.

BACKGROUND

1. Technical Field

The present invention relates to a printing control server, a printing control method, and a printing system.

2. Related Art

In the prior art, a technique is known where printing target data is transmitted and received using email by assigning an address to a printer. In addition, Japanese Unexamined Patent Application Publication No. 2005-115559 discloses a technique where a plurality of addresses are assigned with regard to one printer and printing conditions which are different are associated with the respective addresses which are different to each other. It is possible to execute printing with specific printing conditions in a specific printer if an email where a specific address is set as the destination is transmitted using the technique which is disclosed in Japanese Unexamined Patent Application Publication No. 2005-115559.

However, when using the technique which is disclosed in Japanese Unexamined Patent Application Publication No. 2005-115559, there is a problem in that storage capacity which is necessary for managing the addresses increases since an email server manages the addresses which are the number of printers multiplied by the number of printing settings and the email server and the printer communicate for each of the addresses.

SUMMARY

The present invention has one object of it being possible to suppress the load on a server for managing address and to designate printing conditions using an address of an email which is a printing target.

A printing control server for achieving the object described above stores a device designating character string and a printer device so as to be associated and stores a printing conditions designating character string to be associated with printing conditions separately to the device designating character string. As a result, it is possible to specify the printer device and the printing conditions by extracting the device designating character string and the printing conditions designating character string from an address. Accordingly, due to the invention, it is not necessary to manage addresses for each of the printer devices and each of the printing conditions, and it is possible to suppress an increase of the communication volume and storage capacity which is necessary for managing addresses. In addition, in a case where a first address which includes the device designating character string and a second address which includes the printing conditions designating character string are included separately as the destination of an email, the printing control server for achieving the object described above associates the printer device which corresponds to the first address and printing conditions which correspond to the second address with the content of the email. As a result, it is possible for a user to register the address which corresponds to the printer device and the address which corresponds to the printing conditions to a mail user agent (MUA). Accordingly, for example, it is possible to manage using an MUA by associating arbitrary character strings which represent the printer device (character strings which are different to the device designating character string where it is easy for the user to identify the device) and character strings which represent the printing conditions (character strings which are different to printing condition designating character string where it is easy for the user to identify the printing conditions) with individual addresses. Here, "destination address" means an address which is included in any of "to", "cc" or "bcc". In addition, "content of the email" includes at least any of a header field, body, or attached file of an email. In addition, the "device designating character string" and the "printing condition designating character string" are each configured by characters strings of one or more characters.

The printing control server for achieving the object described above, wherein, in a case where a plurality of the second addresses are included as the destinations of email, it is possible for the user to designate complex printing conditions by associating printing conditions which correspond to each of the second addresses to the content of the email.

The printing control server for achieving the object described above, wherein, in a case where the user designates the same destination address as the destination a plurality of times, the same email with multiple addresses is received a plurality of times. There is a possibility that surplus printing will be executed if printing is executed using a printer with regard to each of the same email which is received a plurality of times. Therefore, it is possible to prevent wasteful printing by not printing the content of all but one of a plurality of emails with multiple addresses which are received by a receiving section.

The printing control server for achieving the object described above, wherein types of destination fields are stored in so as to be associated with the printing conditions, and printing conditions which correspond to a pairing of the second address and a type of destination field, which is included in the second address, may be associated with content of the email in a case when an email is received. Due to this, it is possible for the user to designate printing conditions which are greater in number than the number of second addresses, and the number of emails with multiple addresses is reduced.

The printing control server for achieving the object described above, wherein it is possible for the user to print an email on a plurality of printers using printing conditions which are different by sending the email only once due to the content of the email being printed by the printers by the first address being paired with the second address for each of the destination fields.

The printing control server for achieving the object described above, wherein it is possible for a process where printing data is generated in a user terminal which sends an email or in a printer to be simplified or to be unnecessary by generating printing data according to the content of the email and the printing conditions.

In addition, it is possible for the functions of each of the means which are set forth in the claims to be realized using hardware resources where the function is specified in the configuration itself, hardware resources where the function is specified by a program, or a combination thereof. In addition, the functions of each of the means are not limited to being realized by hardware resources which are physically independent of each other. Furthermore, the invention is established as a printing control method, a printing system or a printing control program, or alternatively as a recording medium of a printing control program. It is obvious that the recording medium of the program may be a magnetic recording medium, a magneto-optical recording medium, or any other recording medium which is developed in the future.

BRIEF DESCRIPTION OF THE DRAWINGS

Referring now to the attached drawings which form a part of this original disclosure.

DETAILED DESCRIPTION OF EXEMPLARY EMBODIMENTS

An embodiment of the present invention will be described below with reference to the attached drawings. Here, the same reference numerals are given to corresponding constituent elements in each of the drawing, and overlapping description is omitted.

1. Summary of Printing System

Figure 1:
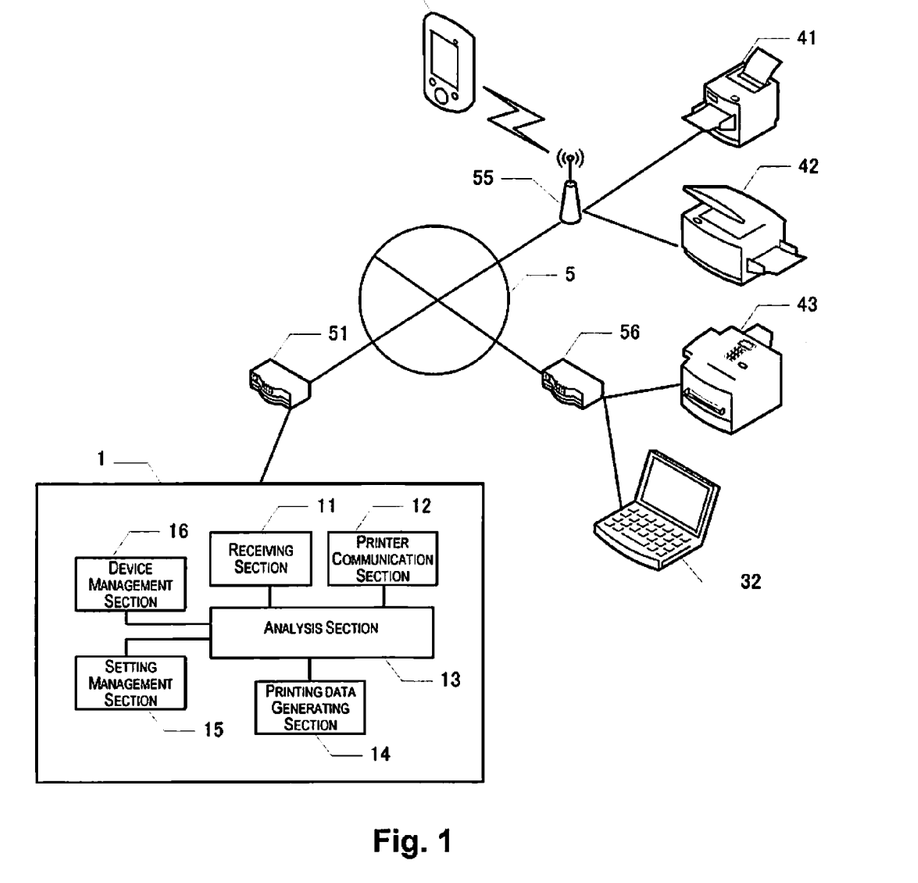
FIG. 1 is a block diagram according to an embodiment of the invention.

An embodiment of a printing system of the present invention is illustrated in FIG. 1. The printing system is provided with a printing control server 1 which is connected with a telecommunications line such as the Internet 5 and one or more of the printers 41, 42 and 43 which have an Internet communication function, and the printing control server 1 and the printers 41, 42 and 43 are each connected via the Internet. The printers 41, 42 and 43 are incorporated into the printing system by a user registering a device ID or the like in the printing control server 1. It is possible for the user to print content of an email using the printers 41, 42 and 43 with printing conditions by the user transmitting an email, where an address which includes a device designating character string in a local section and an address which includes a printing condition designating character string in the local section are set as destinations, from an arbitrary information processing terminal such as a smartphone 31 or a personal computer (PC) 32.

2. Configuration of Printing Control Server

As shown in FIG. 1, the printing control server 1 is a computer system provided with a receiving section 11, a printer communication section 12, an analysis section 13, a printing data generating section 14, a settings management section 15, and a device management section 16. The functions of the receiving section 11, the printer communication section 12, the analysis section 13, the printing data generating section 14, the settings management section 15, and the device management section 16 are realized by a processor which is not shown in the diagram loading a program from an external storage apparatus onto a main storage apparatus and executing the program.

The receiving section 11 functions as an email server. In detail, emails which are based on, for example, the simple mail transfer protocol (SMTP) are sent and received, and emails, which include a domain which is self-assigned in the destination address, are saved.

Figure 2A:
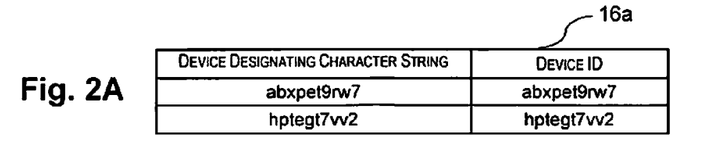
FIGS. 2A and 2B are data structure diagrams according to the embodiment of the invention.

The device management section 16 stores the printer device and the device designating character string in a non-volatile storage medium such as a hard disk apparatus such that the printer device and the device designating character string are associated. In detail, for example, a device management table 16a which is shown in FIG. 2A is used. The device management table 16a associates the printer device and the device designating character string. It is sufficient if it is possible for the device designating character string to specify a printer device of the counterpart with whom the printing control server 1 is communicating with. The device designating character string may be unique for each device or may use a MAC address, a serial number, or an IP address of the printer without any changes, or alternatively, the printing control server 1 may use a unique character string which is uniquely applied within the printing system or may use a character string which is designated by a user over a unique range within the printing system. In the device management table 16a which is shown in FIG. 2A, the user stores the device ID and the device designating character string as separate pieces of data so that it is possible to designate the device designating character string. Here, it is sufficient if the device ID is stored as a device designating character string in a case where the device ID, which is used when the printing control server 1 communicates with the printer, is normally set as a device designating character string without any changes. The device management table 16a is updated by communicating between the printer and the printing control server 1 when the user registers the printer in the printing control server 1. Then, at this time, it is possible to notify the user of a first address which includes the device designating character string and the domain, which correspond to the printer which is registered, via the printer.

Figure 2B:
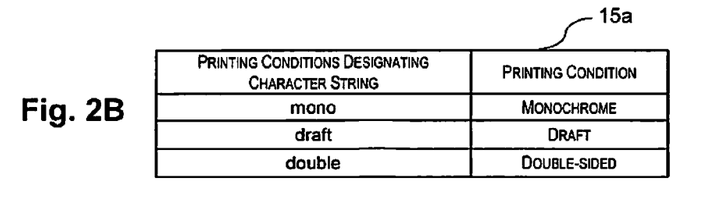

The settings management section 15 stores the printing conditions and a printing conditions designating character string in a non-volatile storage medium such as a hard disk apparatus such that the printing conditions and the printing conditions designating character string are associated. In detail, for example, a device management table 15a which is shown in FIG. 2B is used. The device management table 15a associates typical printing conditions of the printer and the printing conditions designating character string. It is preferable that the printing conditions designating character string set corresponding printing conditions using characters which are easy for the user to identify such as, for example, "mono" with regard to monochrome printing, "draft" with regard to draft printing, and "double" with regard to double-sided printing. Here, printing conditions which do are not associated in the device management table 15 are dependent on the settings of the printer side.

When the receiving section 11 receives an email with a domain destination which is assigned by the printing control server 1, the analysis section 13 specifies content which is the printing conditions, the printer which prints the content, and the printing conditions and associates the printer device and the printing conditions with regard to content of the email using analysis of the email which is stored The printing data generating section 14 converts the content of the printing target into printing data based on the printing conditions and the device which are specified by the analysis section 13. It is sufficient if the printing data is data with a format which it is possible for the device which is specified to process the data as the printing target.

The printer communication section 12 communicates with each of the printers by combining HTTP and a real time communication protocol, such as extensive messaging and presence protocol (XMPP). The printer communication section 12 communicates with the printer which is specified by the analysis section 13 and transmits the printing data to the printer. As a result, the content of the specific email which is received by the printing control server 1 is printed with the printing conditions which are specified by the sender of the email using the printer device which are specified by the sender of the email.

3. Operations of Printing System

Figure 3:
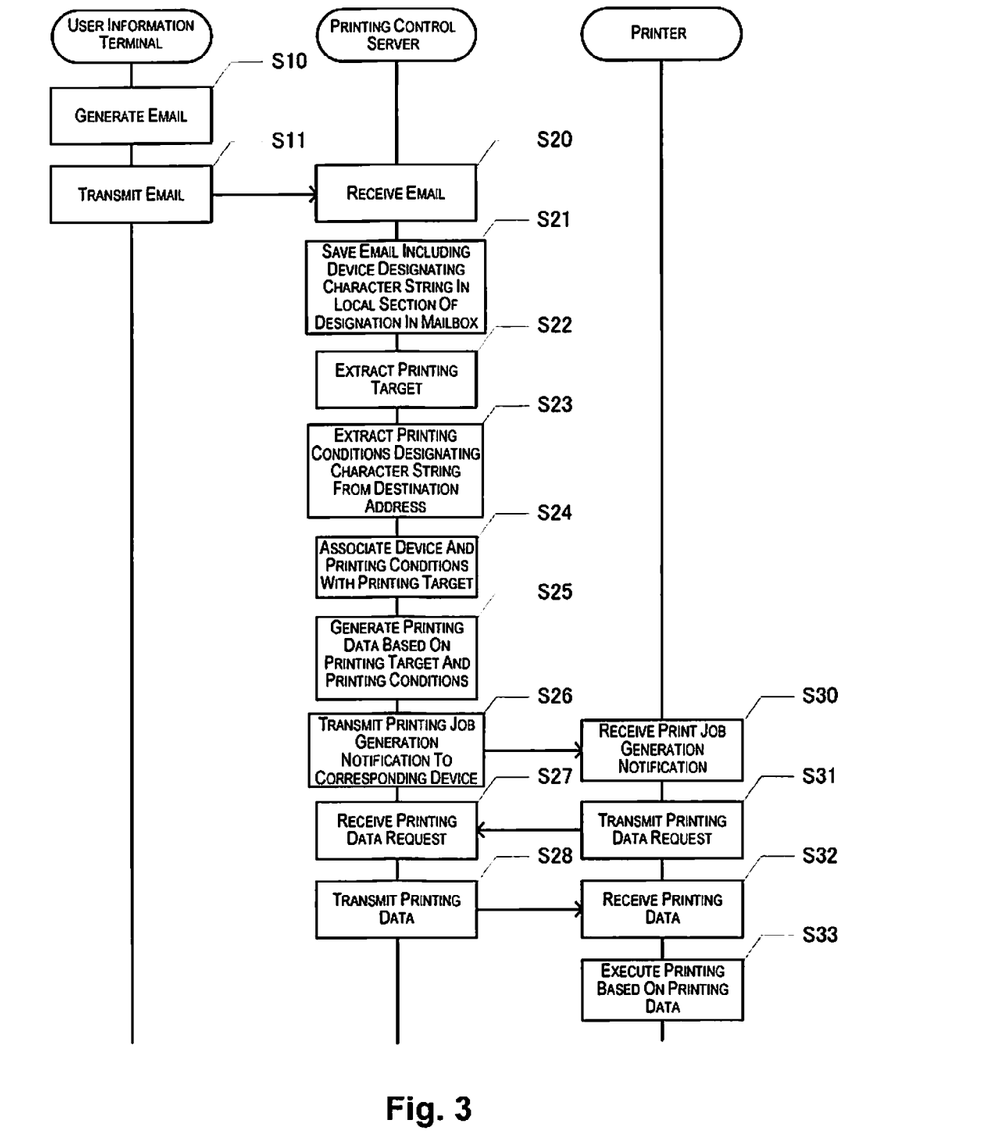
FIG. 3 is a sequence diagram according to the embodiment of the present invention.

Next, the operations of the printing system will be described with reference to FIG. 3.

A user who uses the printing system sets a first address which is notified from the printing control server 1 as the destination and creates an email, which is attached with a file which is the printing target, using an information processing terminal such as the smartphone 31 or the PC 32 (S10). Here, the body of the email is seen as being specified as the printing target in a case where a file is not attached. A first situation which is assumed is a situation where a driver of the printer 43 is not installed in the smartphone 31 of the user but the printer 43 is disposed in front of the user. A second situation which is assumed is a situation where there is an intention by the user to execute printing using the printer 43 which is at located remotely at the home, the office, or at a client of the user. The first address which is notified from the printing control server 1 may set as a "to" destination or may set as a "cc" destination. However, a case in which the first address which is notified from the printing control server 1 is set as a "bcc" destination is invalid as will be described later.

Figure 4:
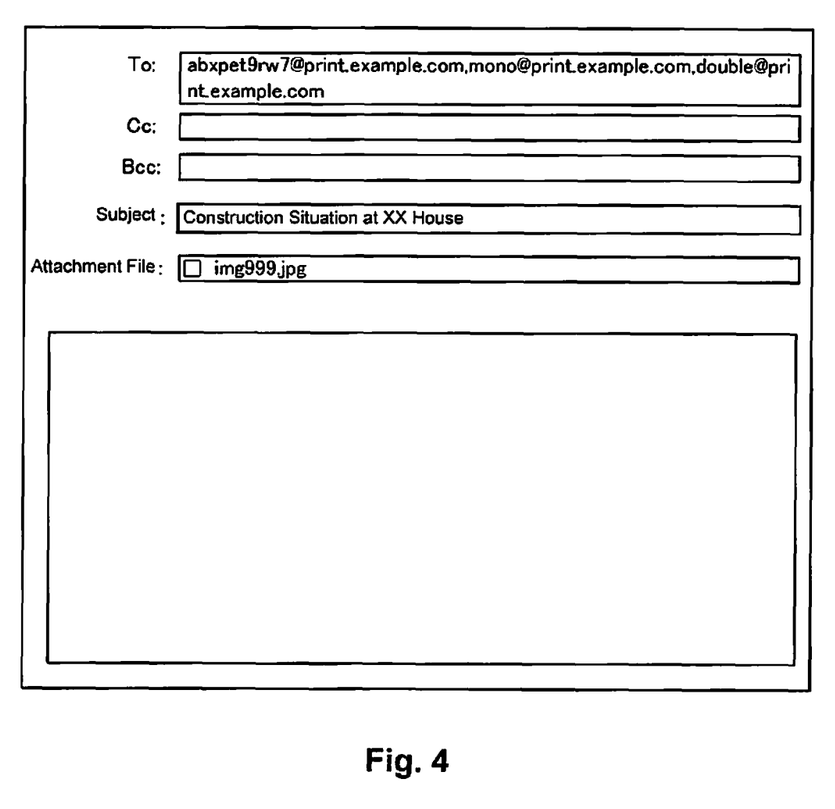
FIG. 4 is a screen configuration diagram according to the embodiment of the invention.

It is possible for the user to designate printing conditions by configuring a local section with a printing conditions designating character string and setting a second address with a domain which is assigned by the printing control server 1 as the destination. In detail, for example as shown in FIG. 4, it is possible to designate monochrome double-sided printing by setting a second address "mono@print.example.com" which is a pairing of a printing conditions designating character string "mono" and a domain "print.example.com" and another second address "double@print.example.com" which is a pairing of a printing conditions designating character string "double" and the domain "print.example.com" as the destinations. It is possible for the user to easily designate the printing conditions by saving the second addresses so as to be associated with a character string which is easy to understand in a MUA address book. For example, it is possible to save the second address "mono@print.example.com" in the address book to be associated with a character string of "monochrome printing".

When an email with a domain destination which is assigned by the printing control server 1 is sent from an arbitrary information processing terminal (S11), the receiving section 11 receives the email via routers 51, 53, 55, and 56, the Internet 5, and the like (S20).

When the email with a domain destination which is assigned by the printing control server 1 is received by the receiving section 11, the analysis section 13 starts analysis of the email which is received.

First, the analysis section 13 determines whether or not the device designating character string is included in the local section of the email address, which is set in "to" or "cc" head field, based on the device management table 16a. Then, an email is discarded when the device designating character string is not included in the local section of the email address which is set in "to" or "cc" head field. Accordingly, the email is invalid in a case where the user sets a first address, which corresponds to the printers 41, 42, and 43 which are registered in the printing control server 1, to "bcc". In a case where the device designating character string is included in the local section of the email address which is written in "to" or "cc" head field, the printer device which corresponds to the device designating character string is specified based on the device management table 16a, and the email is saved in the mailbox which corresponds to the printer device which is specified (S21). Here, the printer device and the mailbox correspond to a one-to-one relationship.

Next, the analysis section 13 extracts and saves the content which is the printing target from the email which is saved in the mailbox (a file which is attached to the email or the body of the email) (S22). In detail, an attachment file is extracted and saved as the printing target in a case where a file is attached to the email. The body is extracted and saved as the printing target in a case where a file is not attached to the email. Here, the analysis section 13 determines whether or not a plurality of emails with multiple addresses which have the same content are stored in the mailbox, and keeps one of the emails and discards the other emails in a case where a plurality of the emails with the same content are saved. The similarity of the content of the emails may be determined based on a message ID which is set as a header of an email or may be determined by comparing the entire content of the email.

Next, the analysis section 13 extracts the local section of the second address from the destination of the email which is saved in the mailbox (S23). That is, the analysis section 13 determines whether the second address with the domain, which is assigned by the printing control server 1 where the local section is configured with the printing conditions designating character string, is included as a destination in the email, and extracts the printing conditions designating character string from the second address in a case where the printing conditions designating character string is included in the second address. Then, the analysis section 13 extracts the printing conditions designating character string from each of the second addresses in the case where a plurality of second addresses are included.

Figure 5:
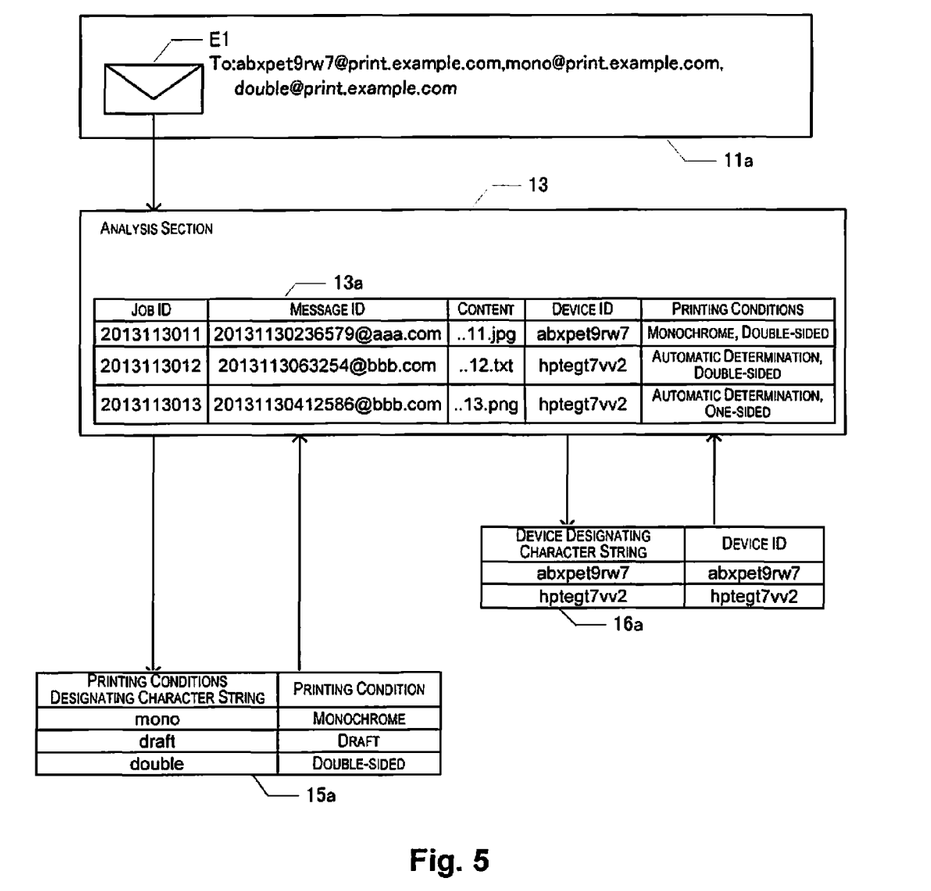
FIG. 5 is a schematic diagram according to the embodiment of the invention.

Next, the analysis section 13 specifies the printing conditions, which correspond to the printing conditions designating character string which is extracted, with reference to the printing conditions management table 15a and associates the printing conditions and the printer device which are specified with the content of the printing target which is saved in step S22 (S24). In detail, in a case where the printing control server 1 receives an email as shown in FIG. 4, the device management table 16a and the printing conditions management table 15a as shown in FIG. 5 are referenced, and a device ID "abxpet9rw7", monochrome printing, double-sided printing, and a content file name "img999.jpg" are associated with a job ID "2013113011" and stored in a print job table 13a.

Next, the printing data generating section 14 generates printing data in accordance with the corresponding device type of the printer and the printing conditions based on the content of the printing target and saves the printing data so as to be associated with the device ID (S25). In detail, it is sufficient if, for example, a file name of the printing data which is generated is saved in the print job table 13a.

When printing data is generated, the printer communication section 12 transmits a print job generation notification for notifying that a print job is generated using the printer device which corresponds to the device ID (S26). As a result, the user receives the print job generation notification for the printer device which corresponds to the device designating character string which is included in the destination address (S30). The print job generation notification includes an URL or the like for downloading printing data. It is possible to transmit a print job without delay from the printing control server 1 to the printer by the print job generation notification being sent and received using a push-type protocol such as XMPP. In a case of using a pull-type protocol, processing load and communication traffic in the printing control server 1 increase since it is necessary for a query from the printer with regard to the printing control server 1 to be periodically carried out.

The printer which receives the print job generation notification waits for an idle state in which it is possible for printing to start and transmits a printing data request, which is for acquiring printing data from the printing control server 1, to the printing control server 1 (S31). For example, HTTP is used in sending and receiving of the printing data request, and an URL or printer device ID for downloading a print job are transmitted via the routers 55 and 56 and the Internet 5. That is, the printers 41, 42 and 43 which are registered in the printing control server 1 are provided with a communication section which has an internet connection function.

When the printing control server 1 receives the printing data request (S27), the printing control server 1 transmits printing data as job data to the printer (S28). For example, HTTP is used in sending and receiving of the printing data.

When the printer receives the printing data in accordance with the print job request (S32), printing is executed in a printing section based on the printing data (S33). The printing section of the printer which is registered in the printing control server 1 may execute printing using any printing method as an inkjet method, a laser method, or a thermal transfer printing method. Since the printing data which is received by the printer is generated according to the printing conditions, which correspond to the printing conditions designating character string which is designated by a user, and the device, which corresponds to the device designating character string which is designated by a user, the printer executes printing according to the printing conditions which are designated by a user.

In the printing system described above, the device management section 16 stores the device designating character string and the printer device so as to be associated, and the settings management section 15 stores the printing conditions designating character string so as to be associated with the printing conditions and to be separate to the device designating character string. As a result, it is not necessary to manage an address for each of the printer devices and each of the printing conditions, and it is possible to suppress storage capacity which is necessary in managing addresses. Then, since it is possible to designate the printer device and the printer conditions using an address, it is possible to use this for other applications such as organizing emails or setting the body or the subject of an email as a printing target. In addition, in the printing system described above, in a case where the first address which includes the device designating character string and the second address which includes printing conditions designating character string are included separately as the destination of an email, the printer device which corresponds to the first address and the printing conditions which correspond to the second address are associated with the content of the email. As a result, it is possible for a user to register the address which corresponds to the printer device and the address which corresponds to the printing conditions to an MUA. Accordingly, it is possible, for example, for a user to manage using an MUA address book by associating the first address with a character string which is different to the device designating character string which easily identify a device and by associating the second address with a character string which is different to the printing conditions designating character string which easily identify a device. In addition, in the printing system described above, in a case where a plurality of the second addresses are included as the destination of an email, it is possible for the user to designate complex printing conditions by associating the content of the email with printing conditions which correspond with each of the second addresses. In addition, in the printing system described above, it is possible to prevent wasteful printing by the printing control server 1 discarding all but one of a plurality of emails with multiple addresses which are received. In addition, in the printing system described above, since the printing control server 1 generates printing data in accordance with the content of the email and the printing conditions, it is possible for a process, where printing data is generated in an information processing terminal of a user where an email is transmitted or in the printer, to be simplified or to be unnecessary.

4. Other Embodiments

Here, the technical scope of the present invention is not limited to the embodiment described above and it is obvious that it is possible to add various modifications within the scope which does not depart from the gist of the present invention.

Figure 6:
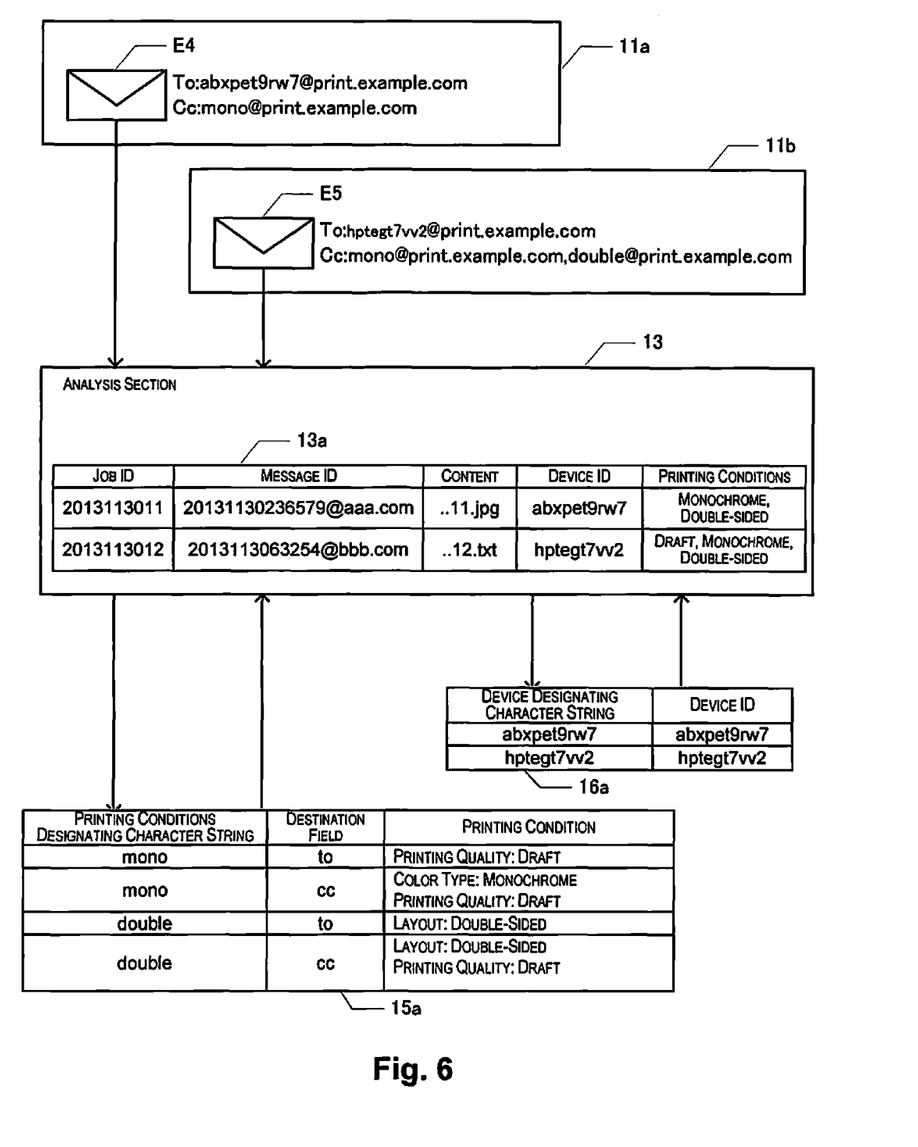
FIG. 6 is a schematic diagram according to the embodiment of the invention.

For example, as shown in FIG. 6, the printing conditions designating character string, the types of destination fields, and the printing conditions may be stored to be associated in the device management table 15a, and the printing conditions which correspond to a pairing of the second addresses and the type of destination field, which is included in the second address, may be associated with content of the email in the analysis section 13. In detail, when referencing the settings management table 15a which is shown in FIG. 6 in a case where an email E4 is saved in a mailbox 11a which corresponds to a device ID "abxpet9rw7" which is shown in FIG. 6, the printing conditions of monochrome and double-sided printing are associated with the content of the email E4. In addition, when referencing the settings management table 15a which is shown in FIG. 6 in a case where an email E5 is saved in a mailbox 11b which corresponds to a device ID "hptegt7vv2" which is shown in FIG. 6, the printing conditions of draft, monochrome and double-sided printing are associated with the content of the email E5.

In addition, for example, a print job may be generated for each destination field in the analysis section 13. That is, a first device which corresponds to the first address which is included as the first destination field of the email and first printing conditions which correspond to the second address which is included as the first destination field are paired and associated with the content of the email, and a second device which is the printer which corresponds to the first address which is included in the second destination field and second printing conditions which correspond to the second address which is included in the second destination field are paired and associated with the content of the email. Then, the printer communication section 12 prints the content of the email using a plurality of devices which correspond to the email with the printing conditions which are paired with the device.

Figure 7:
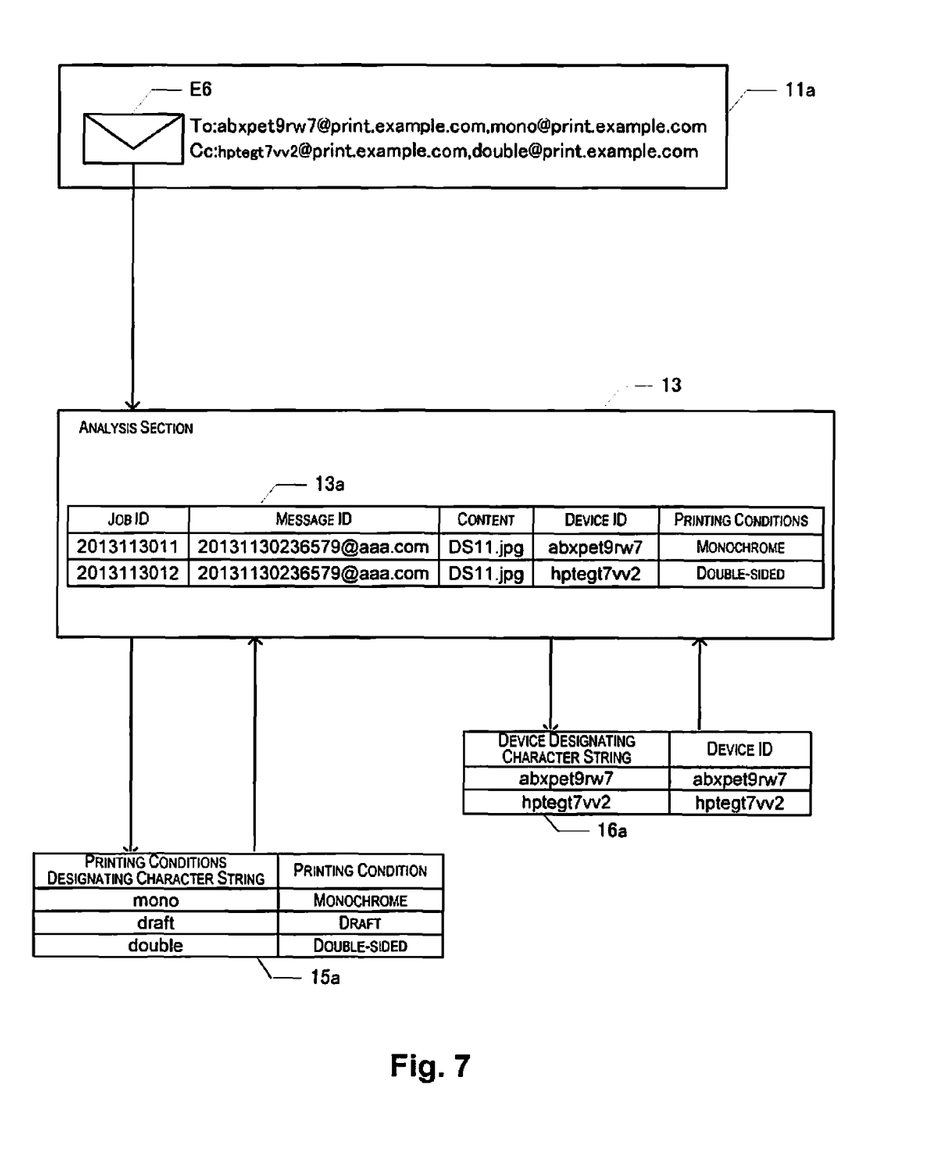
FIG. 7 is a schematic diagram according to the embodiment of the invention.

In detail, for example, when an email E6 which is shown in FIG. 7 is received by the receiving section 11, the analysis section 13 saves the email E6 in the mailbox 11a which corresponds to a device designating character string "abxpet9rw7" of the first address which is set as the "to" destination. Then, the analysis section 13 associates and saves the device ID "abxpet9rw7" which corresponds to a first address "abxpet9rw7@print.example.com" which is set as the "to" destination and the printing setting "monochrome" which corresponds to the second address "mono@print.example.com" with an attached file "DS11.jpg" which is the content of the email E6 in the print job table 13a as a job ID "2013113011" which is the print job. Furthermore, the analysis section 13 associates and saves the device ID "hptegt7vv2" which corresponds to a first address "hptegt7vv2@print.example.com" which is set as the "cc" destination and the printing setting "double-sided" which corresponds to the second address "double@print.example.com" with the attached file "DS11.jpg" which is the content of the email E6 in the print job table 13a as a job ID "2013113012" which is the print job. In this manner, since the printer communication section 12 executes printing using the printer for each print job when the destination field and the print job are associated, it is possible to execute printing with printing conditions which are different for a plurality of printers by the user transmitting a single email. Here, in a case where the same first address and different second addresses are set in different destination fields, the same content is printed by one printer with printing conditions which are different.

In addition, for example, a plurality of printer devices may be associated with regard to one device designating character string in the device management section 16. In this case, for example, it is possible to specify one of the printer devices by pairing an address of the sender of an email and the device designating character string of the destination address. In detail, the printer device and the device designating character string may be stored in the device management section 16 so as to be associated with the sender address, and the printer device which corresponds to the device designating character string and the sender address may be specified in the analysis section 13.

In addition, in a case where a plurality of printer devices are associated with regard to one of the device designating character strings, the analysis section 13 may select one of the devices which corresponds to the printing conditions which are designated. In this case, the printer device and the device designating character string may be stored in the device management section 16 so as to be associated with the printing conditions which correspond to the device.

In addition, for example, even in a case where one of the printer devices is stored in the device management section 16 so as to be associated with respect to one of the device designating character strings, printing using the printer which corresponds to the device designating character string may be permitted or denied depending on the sender address of the email. This is possible to realize by, for example, registering of the address of the sender who authorizes printing using the corresponding device in the device management table 16a.

In addition, for example, the email which is the printing target may be transferred without any changes from the printing control server 1 to each of the printers. For example, one of the local sections of the addresses is assigned to each of the printers, and communication between the printer and the printing control server 1 is set as SMTP. Then, in a similar manner to the embodiment described above, the printing control server 1 may save the email in one mailbox for each of the printers and the mailbox may be monitored from the printer. In this manner, even assuming a case where the email which is received by the printing control server 1 is monitored from the printer, it is possible to suppress an increase of communication volume since addresses are not assigned for each printing condition.

In addition, for example, duplication of the content of emails and wasteful printing may be prevented by discarding without saving all but one email out of the plurality of emails with multiple addresses in the mailbox.

In addition, for example, the printing control server 1 may be configured by a plurality of computer systems. For example, the receiving section 11, the printer communication section 12, the analysis section 13, the printing data generating section 14, the settings management section 15, and the device management section 16 may be configured as separate computer systems, and the printing control server may be realized by network connection with each section.

In addition, for example, the printing control server and each of the printers may be installed on a network with the same domain. For example, only the printer which is connected to the printing control server by LAN with the printing control server may be registered in the printing control server.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing control server configured to control printing by a printer, the printing control server comprising:
 a device management section configured to manage a printer device as the printer and a device designating character string which is unique to the printer so as to be associated;

a settings management section configured to manage a printing condition and a printing conditions designating character string which is set for each printing condition so as to be associated;

a receiving section configured to receive an email which includes a domain in a destination address;

a settings section configured to, in a case where a first address where a local section includes the device designating character string and a second address that is different from the first address and where a local section includes the printing conditions designating character string are included as the destination of the email which is received by the receiving section, set the printing condition which corresponds to the second address with the printer device which corresponds to the first address as a printing destination; and a printer communication section configured to execute printing based on the email using the printing condition which is set with the printer device as the printing destination.

2. The printing control server according to claim 1, wherein in a case where a plurality of second addresses each of which has a local section that includes the printing conditions designating character string are included as the destination of the email which is received by the receiving section, the settings section is configured to associate printing conditions which correspond to the second addresses, respectively, with a content of the email.

3. The printing control server according to claim 1, wherein the printer communication section does not print a content of all but one of a plurality of emails with multiple addresses which are received by the receiving section.

4. The printing control server according to claim 1, wherein the settings management section is further configured to store the printing condition and types of destination fields so as to be associated, and the printing control server further comprises an analysis section configured to associate the printing condition which corresponds to a pairing of the second address and a type of a destination field, which is included in the second address, with a content of the email.

5. The printing control server according to claim 1, further comprising an analysis section configured to pair a first printer device which corresponds to the first address which is included in a first destination field of the email and a first printing condition which corresponds to the second address which is included in the first destination field and associate with a content of the email, the analysis section further being configured to pair a second printer device which is the printer which corresponds to the first address which is included in a second destination field and a second printing condition which corresponds to the second address which is included in the second destination field and associate with a content of the email, the printer communication section being configured to execute printing the contents of the email on a plurality of printer devices which correspond to the email with the printing conditions which are paired with the devices.

6. The printing control server according to claim 1, further comprising a printing data generating section configured to generate printing data based on a content of the email, the printer device which is associated with the email, and the printing condition, wherein the printer communication section is configured to transmit the printing data to the printer device which is associated with the email.

7. A printing control method comprising:

managing a printer device as a printer and a device designating character string which is unique to the printer so as to be associated;

managing a printing condition and a printing conditions designating character string which is set for each printing condition so as to be associated;

receiving an email which includes a domain in a destination address;

setting, in a case where a first address where a local section includes the device designating character string and a second address that is different from the first address and where a local section includes the printing conditions designating character string are included as a destination of the email which is received by the receiving section, the printing condition which corresponds to the second address with the printer device which corresponds to the first address as a printing destination; and executing printing based on the email using the printing condition which is set with the printer device as the printing destination.

8. A printing system including a plurality of printers and a printing control server configured to control printing by the printers, the printing control server being configured to execute printing using the printers, the printing control server comprising:

a device management section configured to manage printer devices as the printers and device designating character strings which are unique to the printers so as to be associated;

a settings management section configured to manage a printing condition and a printing conditions designating character string which is set for each printing condition so as to be associated;

a receiving section configured to receive an email which includes a domain in a destination address;

a settings section configured to, in a case where a first address where a local section includes the device designating character string and a second address that is different from the first address and where a local section includes the printing conditions designating character string are included as a destination of the email which is received by the receiving section, set the printing condition which corresponds to the second address with the printer device which corresponds to the first address as a printing destination; and a printer communication section configured to execute printing based on the email using the printing condition which is set with the printer device as the printing destination, the printers comprising:

a communication section configured to receive job data; and a printing section configured to execute printing based on the job data.

* * * * *